United States Patent
Hosokai et al.

(10) Patent No.: US 10,104,753 B2
(45) Date of Patent: Oct. 16, 2018

(54) OPTICAL WAVEGUIDE FORMING METHOD AND APPARATUS

(71) Applicant: OSAKA UNIVERSITY, Suita-shi, Osaka (JP)

(72) Inventors: Tomonao Hosokai, Suita (JP); Alexey Zhidkov, Suita (JP); Ryousuke Kodama, Suita (JP)

(73) Assignee: OSAKA UNIVERSITY, Suita-shi, Osaka (JP)

( * ) Notice: Subject to any disclaimer, the term of this patent is extended or adjusted under 35 U.S.C. 154(b) by 0 days.

(21) Appl. No.: 15/853,968

(22) Filed: Dec. 26, 2017

(65) Prior Publication Data
US 2018/0184510 A1    Jun. 28, 2018

(30) Foreign Application Priority Data

Dec. 28, 2016  (JP) ................................. 2016-255880

(51) Int. Cl.
| | | |
|---|---|---|
| *H05H 1/00* | (2006.01) | |
| *H05G 2/00* | (2006.01) | |
| *H05H 1/46* | (2006.01) | |
| *H05H 1/04* | (2006.01) | |

(52) U.S. Cl.
CPC ............. *H05G 2/008* (2013.01); *H05G 2/003* (2013.01); *H05H 1/04* (2013.01); *H05H 1/46* (2013.01)

(58) Field of Classification Search
CPC .......... H05G 2/008; H05G 2/003; H05H 1/04; H05H 1/46; H05H 2/4622
See application file for complete search history.

(56) References Cited

U.S. PATENT DOCUMENTS

| | | | |
|---|---|---|---|
| 2004/0108473 A1* | 6/2004 | Melnychuk | ............ B82Y 10/00 |
| | | | 250/504 R |
| 2016/0014874 A1 | 1/2016 | Kaganovich et al. | |

FOREIGN PATENT DOCUMENTS

| | | |
|---|---|---|
| JP | 2001-035691 | 2/2001 |
| JP | 2011-108579 | 6/2011 |

OTHER PUBLICATIONS

"Optical guidance of terrawatt laser pulses by the implosion phase of a fast Z-pinch discharge in a gas-filled capillary", Optics Letters, Tomonao Hosokai et al., Jan. 1, 2000, vol. 25, No. 1, P10-P12.

* cited by examiner

*Primary Examiner* — Dani Fox (57) ABSTRACT

An optical waveguide is formed using a gas-enclosed vessel that has an internal space in which a polyvalent ionizable gas is enclosed, a laser beam irradiation unit, and a discharge circuit that causes a pulse current to flow in the gas-enclosed vessel at an initial current value. The pulse current is increased from the initial current value to a subsequent current value greater than the initial current value, and a polyvalent ionization channel is formed in the internal space, while increasing the pulse current, by irradiating the internal space in the plasma state with a trigger laser beam generated by the pulse laser beam irradiation device. The polyvalent ionization channel expands by an inverse pinch effect after the internal space is irradiated with the trigger laser beam due to a concentration of the pulse current in the internal space.

13 Claims, 6 Drawing Sheets

OPTICAL WAVEGUIDE FORMING METHOD AND APPARATUS

CROSS-REFERENCE TO RELATED APPLICATION

This application claims the benefit of priority from Japanese Patent Application No. 2016-255880, filed Dec. 28, 2016, the entire contents of which are incorporated herein by reference.

BACKGROUND

1. Technical Field

An optical waveguide forming method, an optical waveguide forming apparatus, an electron accelerator, an X-ray laser irradiation apparatus, and a scattered X-ray generator.

2. Description of the Related Art

As an optical waveguide forming method in the related art, a method of forming an optical waveguide using a fast Z-pinch method is described, for example, by Tomonao Hosokai et al. in "Optical guidance of terawatt laser pulses by the implosion phase of a fast Z-pinch discharge in a gas-filled capillary," OPTICS LETTERS, Vol 25, No. 1, p. 10-12, Jan. 1, 2000. In the optical waveguide forming method described in the document, by causing a pulse current to flow into a discharge tube such as a capillary in which helium gas is enclosed using a fast discharge circuit, plasma generated in the discharge tube is contracted in a radial direction by a pinch effect and an optical waveguide is transiently formed in the discharge tube immediately before the plasma stagnates.

SUMMARY

In the optical waveguide forming method, a time at which an optical waveguide is transiently formed in the discharge tube is based on a discharge start time of the fast discharge circuit. On the other hand, a sustaining time in which the optical waveguide is sustained in the discharge tube is less than a switch jitter of discharge in the fast discharge circuit. Accordingly, when a pulse laser beam is guided to the transiently formed optical waveguide, it is not easy to accurately synchronize the pulse laser beam with the optical waveguide. There is a likelihood that it will be difficult to reliably guide the pulse laser beam to the optical waveguide.

Therefore, some of the objectives of various example embodiments of the invention are to provide an optical waveguide forming method, an optical waveguide forming apparatus, an electron accelerator, an X-ray laser irradiation apparatus, and a scattered X-ray generator that can satisfactorily guide a pulse laser beam to an optical waveguide which is transiently formed.

According to some example embodiments of the invention, there is provided an optical waveguide forming method of forming an optical waveguide using a gas-enclosed vessel that has an internal space in which a polyvalent ionizable gas is enclosed, a laser beam irradiation unit that irradiates the internal space with a pulse laser beam, and a discharge circuit that causes a pulse current to flow into the gas-enclosed vessel. The optical waveguide forming method may include: a first step of causing the pulse current to flow into the gas-enclosed vessel using the discharge circuit such that the internal space enters a plasma state; a second step of forming a polyvalent ionization channel in the internal space and causing the polyvalent ionization channel to expand by an inverse pinch effect by irradiating the internal space in the plasma state with the pulse laser beam as a trigger laser beam from the laser beam irradiation unit; and a third step of increasing a current value of the pulse current flowing in the gas-enclosed vessel from before or during the irradiation of the internal space by the trigger laser beam. In some examples, the method may comprise increasing the pulse current from the initial current value to a subsequent current value greater than the initial current value, and forming the polyvalent ionization channel in the internal space while increasing the pulse current. The polyvalent ionization channel expands by the inverse pinch effect due to a concentration of the pulse current in the internal space.

In the optical waveguide forming method, contraction of the polyvalent ionization channel by the pinch effect is started after the polyvalent ionization channel expands by the inverse pinch effect by the irradiation with the trigger laser beam. That is, a formation time at which an optical waveguide is transiently formed by the contraction of the polyvalent ionization channel does not depend on a time at which the discharge circuit starts the discharge but is independent from a switch jitter of the discharge. Rather, the formation time corresponding to the contraction of the polyvalent ionization channel may instead be based on the point in time at which the internal space is irradiated with the trigger laser beam. For example, the optical waveguide may be formed a predetermined time after the internal space is irradiated with the trigger laser beam. As a result, when a pulse laser beam is guided to the transiently formed optical waveguide, it is possible to easily and accurately synchronize the pulse laser beam with the optical waveguide. It is possible to satisfactorily guide the pulse laser beam to the optical waveguide.

In the optical waveguide forming method according to some example embodiments of the invention, the third step may include transiently forming the optical waveguide in the internal space after the irradiation with the trigger laser beam.

In the optical waveguide forming method according to some example embodiments of the invention, the second step may include forming the polyvalent ionization channel which is filament-shaped fully ionized plasma by the irradiation with the trigger laser beam.

In the optical waveguide forming method, the third step may additionally include causing the expanded polyvalent ionization channel to contract using a pinch effect and transiently forming the optical waveguide in the internal space at a predetermined time after the irradiation with the trigger laser beam.

The inventors, through diligent study, found that a voltage waveform which is applied to the gas-enclosed vessel has a rising peak time when an optical waveguide is transiently formed. Therefore, in the optical waveguide forming method according to some example embodiments of the invention, the predetermined time may be determined on the basis of a rising peak time in a voltage waveform which is applied to the gas-enclosed vessel when the optical waveguide is transiently formed in the internal space. Accordingly, it is possible to accurately determine the predetermined time at which an optical waveguide is transiently formed. As a result, when a pulse laser beam is guided to the transiently formed optical waveguide, it is possible to more easily and accurately synchronize the pulse laser beam with the optical waveguide. It is also possible to more satisfactorily guide the pulse laser beam to the optical waveguide.

In the optical waveguide forming method according to some example embodiments of the invention, the predetermined time may be determined on the basis of a type and a density of the gas enclosed in the internal space and the current value of the pulse current flowing in the gas-enclosed vessel. Since influences of the inverse pinch effect and the pinch effect can be understood using the parameters such as the type and the density of the gas and the current value of the pulse current flowing in the gas-enclosed vessel, it is possible to accurately determine the predetermined time at which an optical waveguide is transiently formed on the basis of the parameters. As a result, when a pulse laser beam is guided to the transiently formed optical waveguide, it is possible to more easily and accurately synchronize the pulse laser beam with the optical waveguide. It is also possible to more satisfactorily guide the pulse laser beam to the optical waveguide.

According to other example embodiments of the invention, there is provided an optical waveguide forming apparatus including: a gas-enclosed vessel that has an internal space in which a polyvalent ionizable gas is enclosed; a laser beam irradiation unit that irradiates the internal space with a pulse laser beam; a discharge circuit that causes a pulse current to flow into the gas-enclosed vessel; and a controller that controls the pulse laser beam emitted from the laser beam irradiation unit and the pulse current flowing in the gas-enclosed vessel by the discharge circuit. The controller may include a first pulse current control unit that causes the pulse current to flow into the gas-enclosed vessel using the discharge circuit such that the internal space enters a plasma state, a first irradiation control unit that forms a polyvalent ionization channel in the internal space and causes the polyvalent ionization channel to expand by an inverse pinch effect by irradiating the internal space in the plasma state with the pulse laser beam as a trigger laser beam from the laser beam irradiation unit, and a second pulse current control unit that increases a current value of the pulse current flowing in the gas-enclosed vessel from before or during the irradiation with the trigger laser beam. In some examples, the controller may be configure to increase the pulse current from the initial current value to a subsequent current value greater than the initial current value, and the polyvalent ionization channel is formed in the internal space while the pulse current is increased. The polyvalent ionization channel expands by the inverse pinch effect due to a concentration of the pulse current in the internal space In the optical waveguide forming apparatus, similarly to the optical waveguide forming method, a formation time at which an optical waveguide is transiently formed by contraction of the polyvalent ionization channel does not depend on a time at which the discharge circuit starts discharge but is independent from a switch jitter of the discharge. As discussed above, the formation time may instead be based on the point in time at which the internal space is irradiated with the trigger laser beam. For example, the optical waveguide may be formed a predetermined time after the internal space is irradiated with the trigger laser beam. As a result, when a pulse laser beam is guided to the transiently thrilled optical waveguide, it is possible to easily and accurately synchronize the pulse laser beam with the optical waveguide. It is also possible to satisfactorily guide the pulse laser beam to the optical waveguide.

In the optical waveguide forming apparatus according to some example embodiments of the invention, the second pulse current control unit may transiently form the optical waveguide in the internal space after the irradiation with the trigger laser beam.

The first irradiation control unit may form the polyvalent ionization channel which is filament-shaped fully ionized plasma by the irradiation with the trigger laser beam.

In the optical waveguide forming apparatus according to some example embodiments of the invention, the second pulse current control unit may cause the expanded polyvalent ionization channel to contract using a pinch effect and transiently form the optical waveguide in the internal space at a predetermined time after the irradiation with the trigger laser beam.

According to other example embodiments of the invention, there is provided an electron accelerator including the optical waveguide forming apparatus, wherein the controller further includes a second irradiation control unit that guides a main laser beam to the optical waveguide transiently formed in the internal space and generates a laser wake field for accelerating an electron beam in the internal space by irradiating the internal space with the pulse laser beam as the main laser beam from the laser beam irradiation unit after the irradiation with the trigger laser beam.

Since the electron accelerator includes the optical waveguide forming apparatus, the electron accelerator can satisfactorily guide a main laser beam for generating a laser wake field to the transiently formed optical waveguide. In the electron accelerator, since a trigger laser beam and a main laser beam propagate in the same optical path, it is not necessary to perform alignment of the main laser beam with the optical waveguide.

According to other example embodiments of the invention, there is provided an X-ray laser irradiation apparatus including the optical waveguide forming apparatus, wherein the controller further includes a third irradiation control unit that guides a main laser beam to the optical waveguide transiently formed in the internal space and forms an inversely distributed state in which an X-ray laser beam is oscillated in the internal space by irradiating the internal space with the pulse laser beam as the main laser beam from the laser beam irradiation unit after the irradiation with the trigger laser beam.

Since the X-ray laser irradiation apparatus includes the optical waveguide forming apparatus, the X-ray laser irradiation apparatus can satisfactorily guide a main laser beam for forming an inversely distributed state to the transiently formed optical waveguide. In the X-ray laser irradiation apparatus, since a trigger laser beam and a main laser beam propagate in the same optical path, it is not necessary to perform alignment of the main laser beam with the optical waveguide.

According to other example embodiments of the invention, there is provided a scattered X-ray generator including: the optical waveguide forming apparatus; and an electron beam source that irradiates the internal space with an electron beam to collide with the pulse laser beam from the laser beam irradiation unit, wherein the controller further includes a fourth irradiation control unit that generates scattered X-rays in the optical waveguide transiently formed in the internal space by Compton scattering by irradiating the internal space with the pulse laser beam as the main laser beam from the laser beam irradiation unit after the irradiation with the trigger laser beam and irradiating the internal space with the electron beam from the electron beam source.

Since the scattered X-ray generator includes the optical waveguide forming apparatus, the scattered X-ray generator can satisfactorily guide a main laser beam and an electron beam for generating scattered X-rays by Compton scattering to the transiently formed optical waveguide. In the scattered X-ray generator, since a trigger laser beam and a main laser beam propagate in the same optical path, it is not necessary to perform alignment of the main laser beam with the optical waveguide.

DESCRIPTION OF EMBODIMENTS

Hereinafter, example embodiments of the invention will be described in detail with reference to the accompanying drawings. In the following description, the same or corresponding elements will be referenced by the same reference signs and description thereof will not be repeated.

First Embodiment

Figure 1:
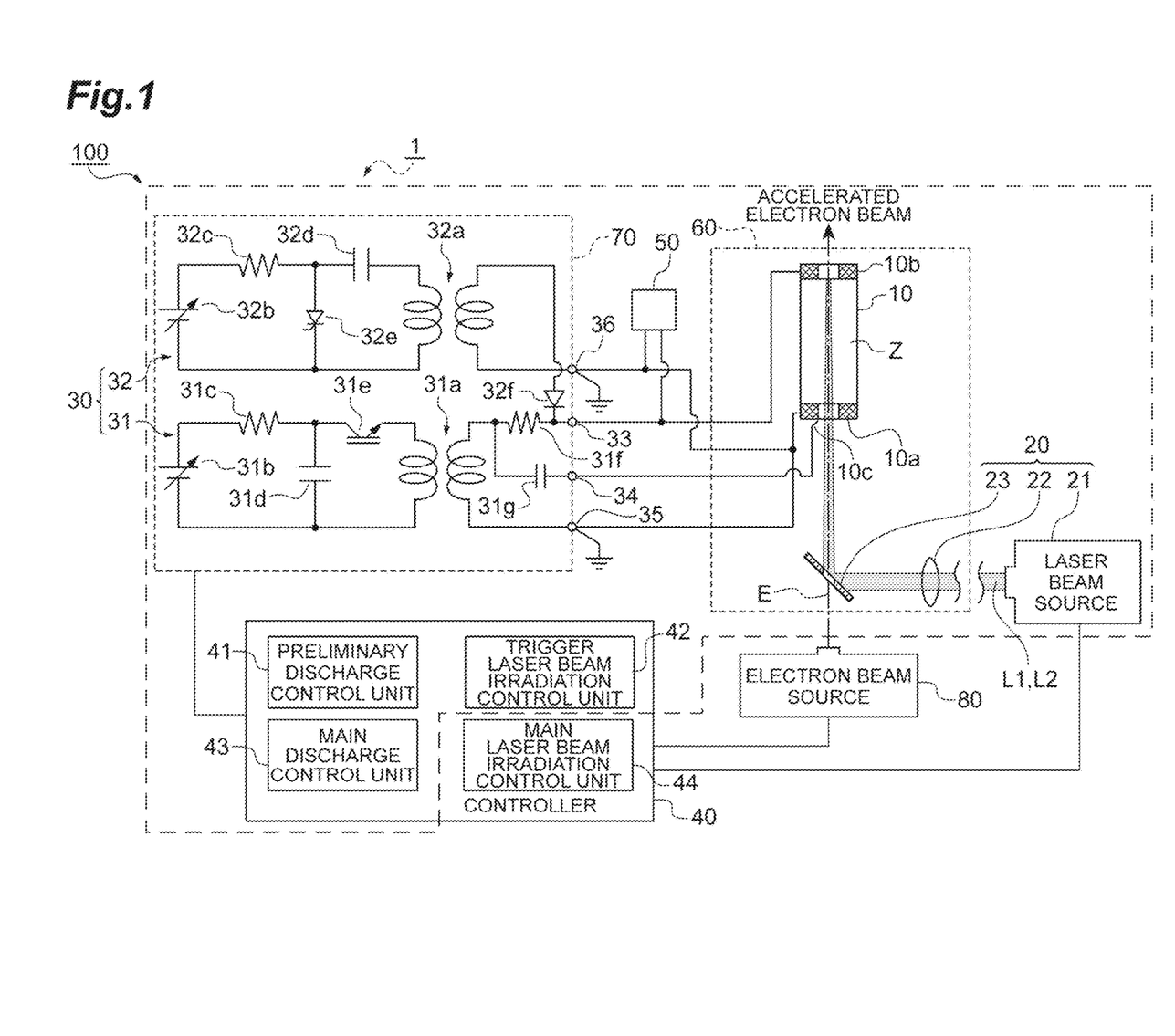
FIG. 1 is a diagram schematically illustrating a configuration of an electron accelerator according to a first embodiment.

FIG. 1 is a diagram schematically illustrating a configuration of an electron accelerator 100 including an optical waveguide forming apparatus 1. The electron accelerator 100 illustrated in FIG. 1 is a laser-driven plasma electron accelerator that excites a laser wake field (an electric field) with an ultrahigh intensity in plasma using a pulse laser beam condensed with a high intensity and accelerates an electron beam up to an ultrahigh energy of giga electron volts using the laser wake field. The electron accelerator 100 includes an optical waveguide forming apparatus 1 that forms an optical waveguide in which a pulse laser beam can propagate a long distance (for example, 10 cm) in a condensed state. The electron accelerator 100 includes a discharge tube 10, a laser beam irradiation unit 20, a discharge circuit 30, a controller 40, and a voltage waveform measuring device 50.

The discharge tube 10 is, for example, a circular tube that is formed of glass, ceramic, or the like. The discharge tube 10 has an internal space Z in which a polyvalent ionizable gas is enclosed. The discharge tube 10 constitutes a gas-enclosed vessel. The inner diameter of the discharge tube 10 is not particularly limited and may be, for example, larger than 1 mm. Examples of the gas include argon gas and helium gas. A negative electrode 10a and a positive electrode 10b having a through-hole are disposed coaxially at both ends of the discharge tube 10. The negative electrode 10a and the positive electrode 10b are electrically connected to the discharge circuit 30. The discharge tube 10 is disposed in a vacuum vessel 60.

The laser beam irradiation unit 20 condenses and irradiates the internal space Z with a pulse laser beam as a trigger laser beam L1. The laser beam irradiation unit 20 condenses and irradiates the internal space Z with a pulse laser beam as a main laser beam L2. For example, the pulse laser beam is a near-infrared laser beam. The laser beam irradiation unit 20 includes a laser beam source 21, a condensing lens 22, and a mirror 23. In the laser beam irradiation unit 20, a pulse laser beam emitted from the laser beam source 21 is condensed by the condensing lens 22, is reflected by the mirror 23, propagates in an axial direction of the discharge tube 10, and enters the internal space Z from the negative electrode 10a of the discharge tube 10. Here, the laser beam irradiation unit 20 applies a pulse laser beam to a position of an axial center of the discharge tube 10 in the internal space Z in the axial direction.

The discharge circuit 30 is a circuit that causes a pulse current to flow into the discharge tube 10. The discharge circuit 30 is accommodated in a power supply box 70. The discharge circuit 30 includes a preliminary discharge circuit 31 that causes a preliminary discharge pulse current to flow into the discharge tube 10 and a main discharge circuit 32 that causes a main discharge pulse current to flow into the discharge tube 10 in addition to the preliminary discharge pulse current.

Figure 2A:
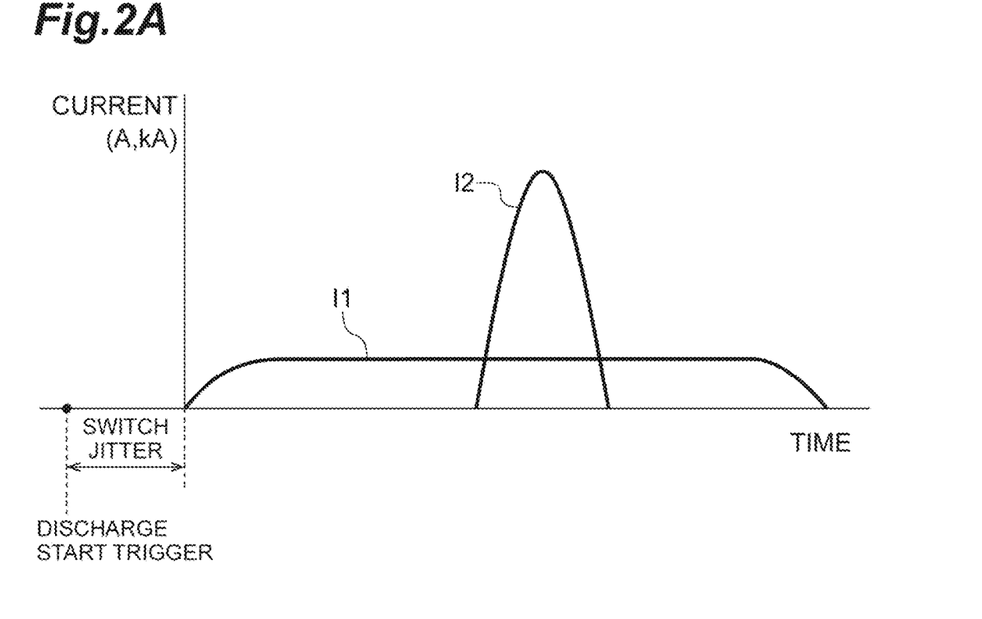
FIG. 2A is a graph illustrating a preliminary discharge pulse current and a main discharge pulse current.

FIG. 2A is a graph illustrating a preliminary discharge pulse current I1 and a main discharge pulse current I2. The current value of the preliminary discharge pulse current I1 ranges, for example, from several amperes to ten amperes, and is ten amperes in the present example. The current value of the main discharge pulse current I2 is, for example, equal to or less than several kiloamperes and is 5 kiloamperes in the present example. As illustrated in FIG. 2A, the preliminary discharge pulse current I1 has slower rising and falling than the main discharge pulse current I2 and a low peak which is sustained for a long time. The main discharge pulse current I2 has faster rising and falling and a higher peak than the preliminary discharge pulse current I1.

As illustrated in FIGS. 1 and 2A, the preliminary discharge circuit 31 includes a preliminary discharge pulse transformer 31a. As illustrated in the drawings, a primary side of the preliminary discharge circuit 31 includes a variable DC power source 31b, a resistor 31c, a capacitor 31d, and an insulating gate bipolar transistor (IGBT) 31e. A secondary side of the preliminary discharge circuit 31 includes a resistor 31f and a capacitor 31g. The secondary side of the preliminary discharge circuit 31 is connected to a positive electrode terminal 33, a spark-discharge positive electrode terminal 34, and a first negative electrode terminal 35. The positive electrode terminal 33 is connected to the positive electrode 10b of the discharge tube 10. The spark-discharge positive electrode terminal 34 is connected to a needle electrode 10c disposed in the vicinity of the negative electrode 10a of the discharge tube 10. The first negative electrode terminal 35 is connected to the negative electrode 10a of the discharge tube and is grounded.

The preliminary discharge circuit 31 causes the preliminary discharge pulse current I1 to flow into the discharge tube 10 such that the internal space Z of the discharge tube 10 becomes a plasma state on the basis of a command from the controller 40. Specifically, when a discharge start trigger is input to the IGBT 31e from the controller 40, the preliminary discharge circuit 31 causes a pulse current to flow into the positive electrode 10b and causes the needle electrode 10c, in response to the input, to perform a spark discharge. The preliminary discharge circuit 31 then causes the preliminary discharge pulse current I1 to flow into the negative electrode 10a, causes the positive electrode 10b to start a preliminary discharge, and preliminarily ionizes the gas in the internal space Z of the discharge tube 10 (forms a plasma state). For example, a switch jitter of 10 ns or less is present between the input of the discharge start trigger and the rising of the preliminary discharge pulse current I1 (see FIG. 2A). Radiation such as ultraviolet rays which are generated by the spark discharge is applied to the gas in the internal space Z of the discharge tube 10 and thus the preliminary discharge pulse current I1 can be allowed to flow easily in the discharge tube 10.

The main discharge circuit 32 includes a main discharge pulse transformer 32a. As illustrated in FIG. 1, a primary side of the main discharge circuit 32 includes a variable DC power source 32b, a resistor 32c, a capacitor 32d, and a thyristor 32e. A secondary side of the main discharge circuit 32 includes a diode 32f. The secondary side of the main discharge circuit 32 is connected to the positive electrode terminal 33 and a second negative electrode terminal 36. The second negative electrode terminal 36 is connected to the negative electrode 10a of the discharge tube 10 and is grounded.

The main discharge circuit 32 causes the main discharge pulse current in addition to the preliminary discharge pulse current to flow in the discharge tube 10 before the internal space Z is irradiated by the trigger laser beam L1 from the laser beam irradiation unit 20 on the basis of a command from the controller 40. Additionally, the main discharge circuit 32 increases the current value of the pulse current flowing in the discharge tube 10 from before the irradiation with the trigger laser beam L1. Specifically, when a main discharge start trigger is input to the thyristor 32e from the controller 40 before the irradiation with the trigger laser beam L1, the main discharge circuit 32 applies the main discharge pulse current to the negative electrode 10a and the positive electrode 10b in response to the input and starts main discharge.

The controller 40 includes, for example, one or more computer apparatuses. The controller 40 includes a central processing unit (CPU) which is a processor and a random access memory (RAM) or a read only memory (ROM) which is a recording medium. The controller 40 performs a variety of controls by reading a program and the like to hardware such as the CPU and the RAM. The controller 40 may be connected to an input unit such as a mouse or a keyboard and a display unit such as a monitor.

The controller 40 controls a pulse laser beam which is applied from the laser beam irradiation unit 20 and a pulse current which flows in the discharge tube 10 from the discharge circuit 30. The controller 40 includes a preliminary discharge control unit (a first pulse current control unit) 41, a trigger laser beam irradiation control unit (a first irradiation control unit) 42, a main discharge control unit (a second pulse current control unit) 43, and a main laser beam irradiation control unit (a second irradiation control unit) 44.

The preliminary discharge control unit 41 outputs a discharge start trigger to the IGBT 31e of the preliminary discharge circuit 31. Accordingly, the preliminary discharge circuit 31 causes the preliminary discharge pulse current I1 to flow in the discharge tube 10 such that the internal space Z of the discharge tube 10 becomes a plasma state.

The trigger laser beam irradiation control unit 42 controls the laser beam source 21 such that the internal space Z in the plasma state is irradiated with a trigger laser beam L1 along the center axis of the discharge tube 10. Accordingly, a polyvalent ionization channel having a cylindrical shape with the center axis as an axial direction is formed in the internal space Z, and the polyvalent ionization channel is caused to expand in the radial direction by the inverse pinch effect. The irradiation condition of the trigger layer beam L1 is a condition in which monovalent ionized plasma in the internal space Z can be ionized polyvalent. The irradiation condition of the trigger laser beam L1 can be determined on the basis of the type and the density of the gas enclosed in the internal space Z.

The formation of the polyvalent ionization channel and the inverse pinch effect will be specifically described below. In the internal space Z in the plasma state, the temperature of the center axis can be increased to form a state in which electric conductivity of the center axis is high (resistance is low) by applying the trigger laser beam L1 along the center axis of the discharge tube 10. Accordingly, filament-shaped fully ionized plasma, that is, the polyvalent ionization channel (a central conductor in the inverse pinch effect), can be instantaneously formed on the center axis. As a result, the pulse current flowing in the discharge tube 10 is instantaneously concentrated on the center axis and the inverse pinch effect (also referred to as inverse pinch) is started. In view of the inverse pinch effect, the polyvalent ionization channel is further heated due to the concentration of the pulse current and the polyvalent ionization channel expands in the radial direction.

The main discharge control unit 43 outputs a main discharge start trigger to the thyristor 32e of the main discharge circuit 32 at a prescribed time after the discharge start trigger is output and before the trigger laser beam L1 is applied from the laser beam irradiation unit 20. Accordingly, the current value of the pulse current flowing in the discharge tube 10 is increased from the preliminary discharge pulse current I1 to a current value in which a main discharge pulse current I2 is combined with the preliminary discharge pulse current I1. By increasing the pulse current, the expanded polyvalent ionization channel is caused to contract by the pinch effect and an optical waveguide is transiently formed in the internal space Z at an optical waveguide formation time which is a predetermined time after the trigger laser beam L1 is applied from the laser beam irradiation unit 20 to irradiate the internal space Z.

The pinch effect and the formation of an optical waveguide will be specifically described below. By increasing the pulse current, the plasma which has been preliminarily ionized in the internal space Z of the discharge tube 10 is further heated and a magnetic pressure of a 0 magnetic field (a pressure inward in the radial direction in the internal space Z) formed by the pulse current is increased. At a point in time at which the pressure of the expanding polyvalent ionization channel and the magnetic pressure are balanced, expansion of the polyvalent ionization channel stops. By continuously increasing the pulse current, the expanded polyvalent ionization channel is caused to contract (implode) by the pinch effect. An impulse wave is driven to the front side of the polyvalent ionization channel which contracts fast, and an optical waveguide is transiently formed in the internal space Z by an interaction between the polyvalent ionization channel and the impulse wave at an optical waveguide formation time (see FIG. 4) which is a predetermined time immediately before the contraction stagnates and after the trigger laser beam L1 has irradiated the internal space Z. The optical waveguide formation time is, for example, equal to or less than 1 ns.

Figure 2B:
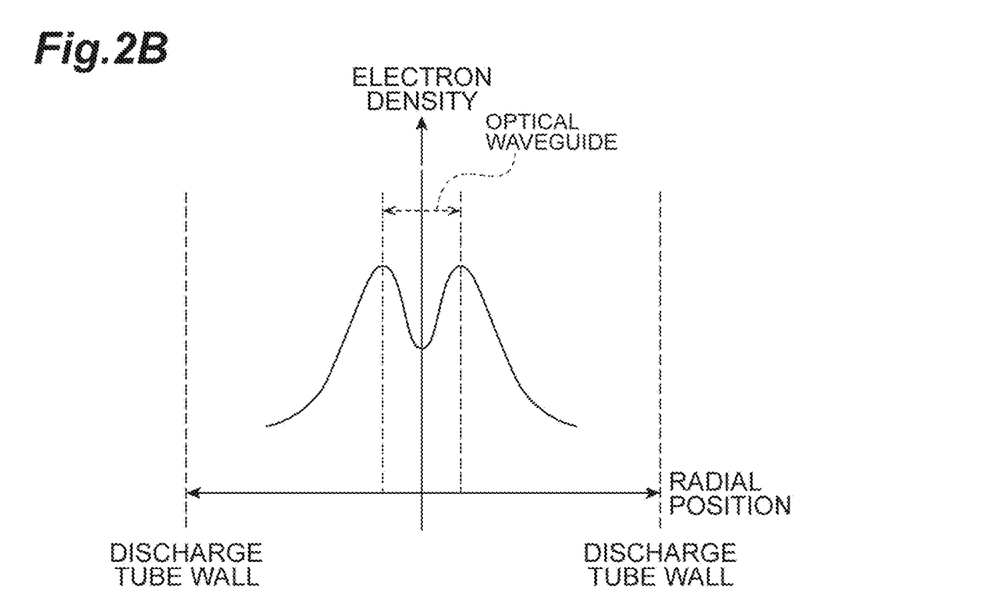
FIG. 2B is a graph illustrating an electron density distribution in an internal space of a discharge tube at a point in time at which an optical waveguide is formed.

FIG. 2B is a graph illustrating an electron density distribution in the internal space Z at a point in time at which an optical waveguide is formed. In the graph illustrated in FIG. 2B, an electron density distribution on a surface perpendicular to the axial direction of the discharge tube 10 is illustrated. An optical waveguide which is transiently formed in the internal space Z has the same function as optical fiber. In the optical waveguide, the electron density distribution in the radial direction has a parabolic concave shape and the distribution is uniformly sustained in the axial direction. The parabolic concave electron density distribution generates the same convex refraction index distribution as optical fiber.

Referring back to FIG. 1, the main laser beam irradiation control unit 44 controls the laser beam source 21 such that the internal space Z is irradiated with a main laser beam L2 from the laser beam source 21 in the optical waveguide formation time after the internal space Z is irradiated with the preliminary discharge pulse current I1. Accordingly, the main laser beam L2 propagates in the optical waveguide which is transiently formed in the internal space Z, and a laser wake field for accelerating an electron beam is generated in the internal space Z by a ponderomotive force of the main laser beam L2.

The controller 40 controls an electron beam source 80 such that an electron beam E is emitted from the electron beam source 80 in the axial direction of the discharge tube 10. The electron beam E emitted from the electron beam source 80 propagates in the axial direction of the discharge tube 10, passes through the mirror 23 via a hole formed in the mirror 23, and enters the internal space Z from the negative electrode 10a side of the discharge tube 10 to be coaxial with the pulse laser beam from the laser beam irradiation unit 20.

The voltage waveform measuring device 50 monitors a voltage waveform which is applied to the discharge tube 10. The voltage waveform measuring device 50 is connected between the positive electrode terminal 33 and the second negative electrode terminal 36. For example, an oscilloscope can be used as the voltage waveform measuring device 50. The voltage waveform measuring device 50 may be configured to monitor a rising peak time of the voltage waveform which is expressed by an increase in impedance at the time of appearance of a polyvalent ionization channel. The controller 40 can determine the optical waveguide formation time in which the polyvalent ionization channel appears on the basis of the rising peak time of the voltage waveform.

A method of accelerating an electron beam by forming an optical waveguide using the electron accelerator 100 will be described below with reference to FIGS. 3 and 4.

Figure 3:
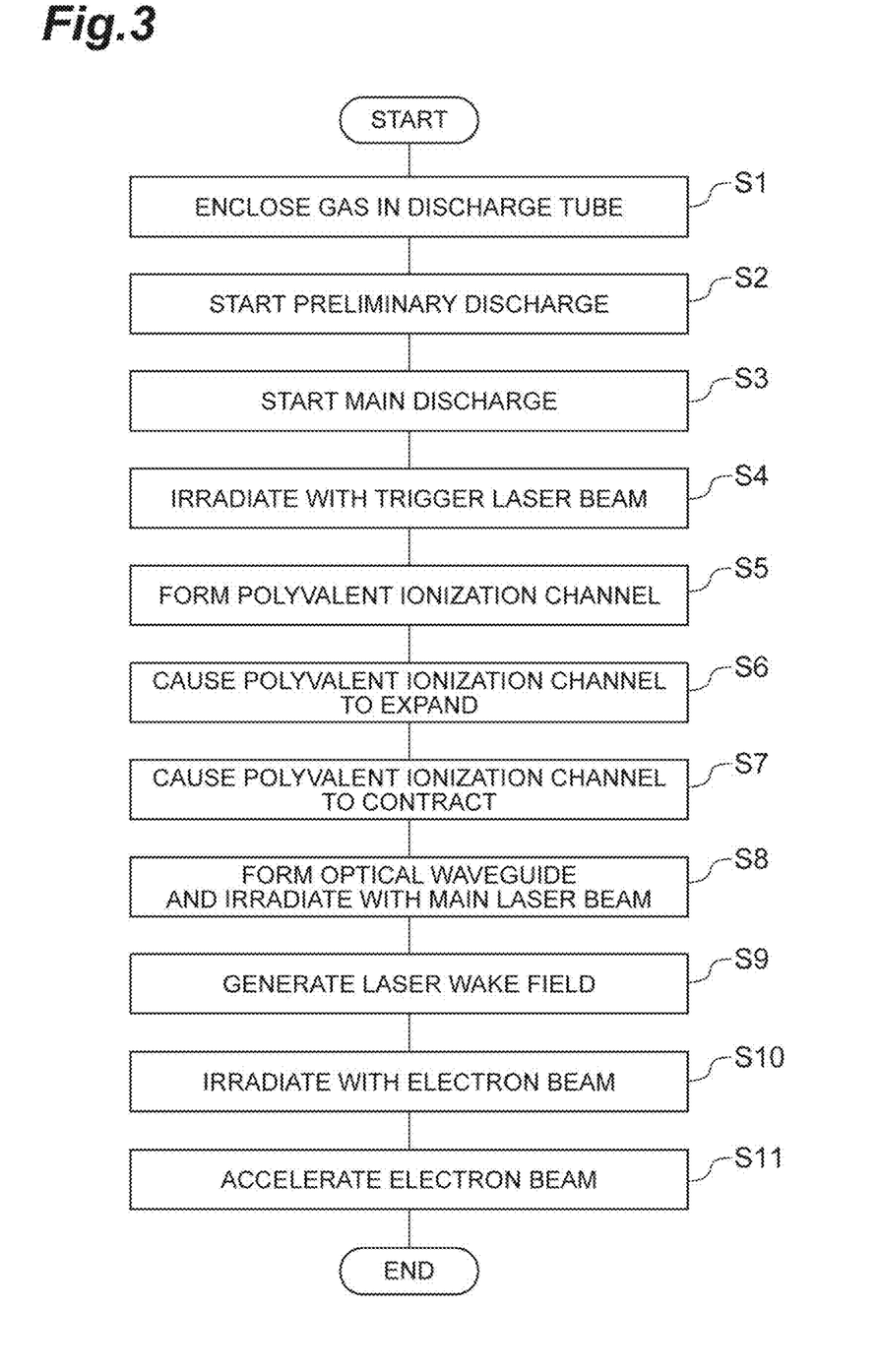
FIG. 3 is a flowchart illustrating an electron acceleration method including an optical waveguide forming method according to the first embodiment.
Figure 4:
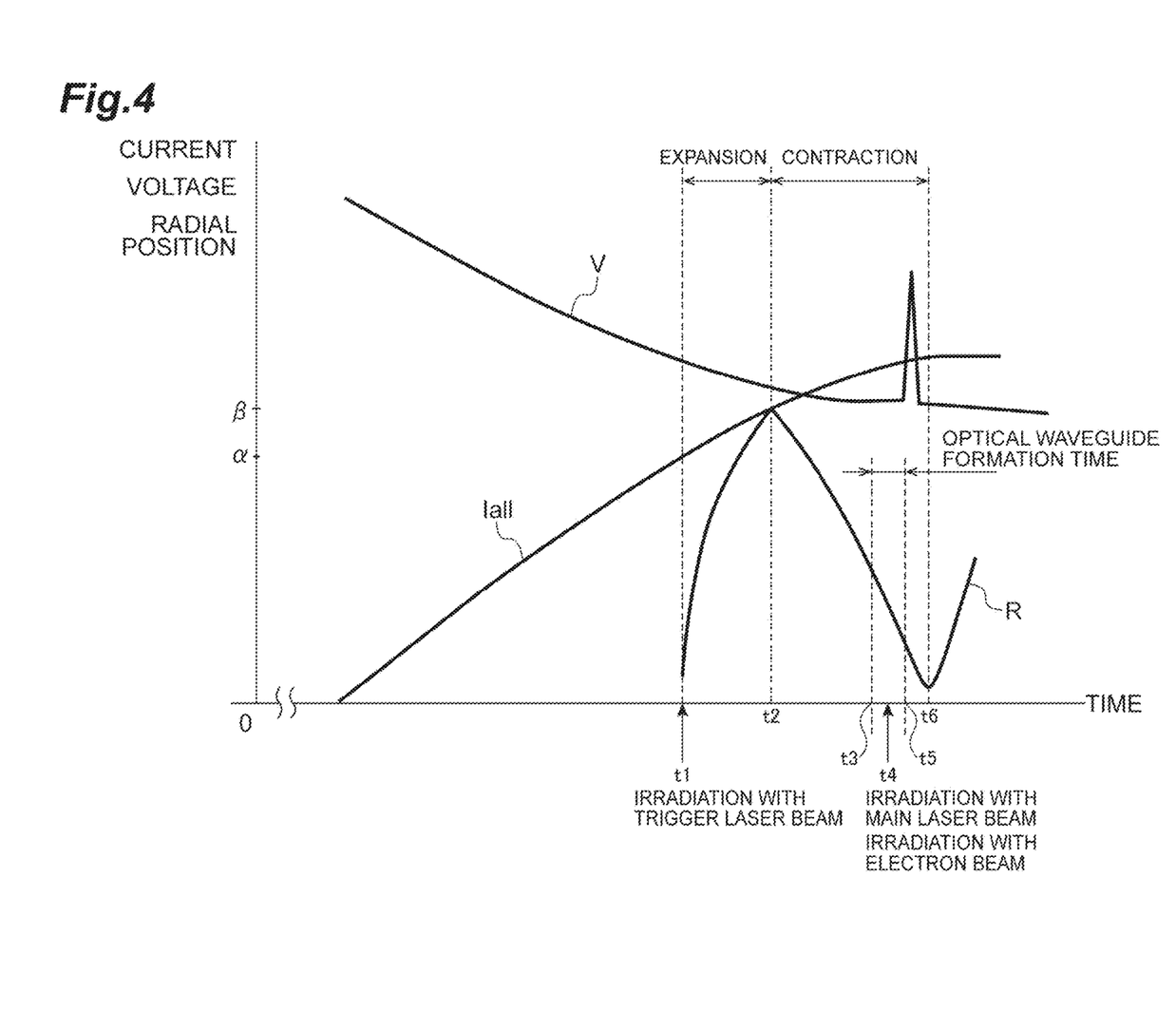
FIG. 4 is a graph illustrating changes of a pulse current, a voltage which is applied to a discharge tube, and a radius of a polyvalent ionization channel with respect to time.

FIG. 3 is a flowchart illustrating an electron accelerating method including an optical waveguide forming method. FIG. 4 is a graph illustrating changes of a main discharge pulse current I2, a voltage V which is applied to the discharge tube 10, and a radius R of a polyvalent ionization channel with respect to time. First, gas is enclosed in the internal space Z of the discharge tube 10 (Step S1). Preliminary discharge is started by the preliminary discharge circuit 31 of the discharge circuit 30 (Step S2). In Step S2, the preliminary discharge control unit 41 of the controller 40 inputs a discharge start trigger to the IGBT 31e and the preliminary discharge circuit 31 causes the preliminary discharge pulse current I1 to flow into the discharge tube 10. Accordingly, the internal space Z becomes a uniformly monovalent ionized plasma state (is preliminarily ionized).

A main discharge is started by the main discharge circuit 32 of the discharge circuit 30 (Step S3). In Step S3, the main discharge control unit 43 of the controller 40 inputs a main discharge start trigger to the thyristor 32e, and the main discharge pulse current I2 in addition to the preliminary discharge pulse current I1 is caused to flow in the discharge tube 10. Accordingly, the current value $I_{all}$ of the pulse current flowing in the discharge tube 10 is increased with the elapse of time.

At time t1 at which the current value of the pulse current flowing in the discharge tube 10 becomes a first value α, the trigger laser beam irradiation control unit 42 of the controller 40 emits a trigger laser beam L1 from the laser beam source 21 and irradiates the internal space Z with the trigger laser beam L1 along the center axis thereof (Step S4). With the irradiation of the internal space Z by the trigger laser beam L1, a polyvalent ionization channel is formed in the internal space Z (Step S5). The polyvalent ionization channel is caused to expand in the radial direction by the inverse pinch effect (Step S6).

At time t2 at which the current value $I_{all}$ of the pulse current which increases with the elapse of time becomes a second value β, the magnetic pressure of the θ magnetic field formed by the pulse current is balanced with the pressure of the polyvalent ionization channel and then the polyvalent ionization channel is caused to contract (Step S7).

In an optical waveguide formation time from time t3 to time t5 immediately before time t6 at which contraction of the polyvalent ionization channel stagnates and after the irradiation with the trigger layer beam L1, an optical waveguide is transiently formed in the internal space Z. In addition, at time t4 in the optical waveguide formation time, a main laser beam L2 with a high intensity over TW (terawatt) is emitted from the laser beam source 21 and the internal space Z is irradiated with the main laser beam L2 along the center axis thereof (Step S8). The main laser beam L2 is guided to the optical waveguide and a laser wake field is generated in the internal space Z (Step S9).

By the main laser beam irradiation control unit 44 of the controller 40, an electron beam E is emitted from the electron beam source 80 to the internal space Z in the optical waveguide formation time and an electron beam E is incident on the laser wake field generated in the internal space Z (Step S10). The electron beam E is accelerated by the laser wake field, and is emitted from the positive electrode 10b of the discharge tube 10 (Step S11).

According to the above-mentioned embodiment, contraction of a polyvalent ionization channel due to the pinch effect is started after the polyvalent ionization channel is caused to expand due to the inverse pinch effect by the irradiation with the trigger laser beam L1. That is, the formation time at which an optical waveguide is transiently forming by the contraction of the polyvalent ionization channel does not depend on the discharge start time of the discharge circuit 30 but is independent from the switch jitter of discharge. The optical waveguide may be transiently formed a short time after the internal space Z is irradiated with the trigger laser beam L1. The optical waveguide formation time may correspond to a predetermined time following the irradiation with the trigger laser beam L1. Accordingly, it is possible to easily and accurately synchronize the main laser beam L2 with the optical waveguide. It is also possible to satisfactorily guide the main laser beam L2 to the optical waveguide. Additionally, the main laser beam L2 may be configured to generate a laser wake field.

According to some example embodiments, the trigger laser beam L1 and the main laser beam L2 propagate in the same optical path. Accordingly, it is possible to more accurately synchronize the main laser beam L2 with the optical waveguide. It is not necessary to perform alignment of the main laser beam L2 with the optical waveguide.

Additionally, in some example embodiments, a voltage waveform which is applied to the discharge tube 10 is monitored by the voltage waveform measuring device 50. Since it is found that a rising peak time appears in the voltage waveform which is applied to the discharge tube 10 due to an increase in impedance at the time of appearance of the polyvalent ionization channel, it is possible to accurately determine the optical waveguide formation time (the predetermined time) in which the polyvalent ionization channel appears without using a camera or the like by monitoring the voltage waveform. Accordingly, by determining the optical waveguide formation time from the rising peak time of the voltage waveform in advance, and by applying the main laser beam L2 in the optical waveguide formation time, it is possible to more easily and accurately synchronize the main laser beam 12 with the optical waveguide and to more satisfactorily guide the main laser beam L2 to the optical waveguide.

Since a discharge tube 10 having a large radius can be used, there is less concern that a pulse laser beam will come in contact with the discharge tube 10 to damage the discharge tube 10. A fast discharge circuit (a pulse power source with low inductance) is not necessary and the structure can be simplified. The optical waveguide can enable a main laser beam L2 which is a pulse laser beam with a high intensity to propagate a longer distance with a scale of $\frac{1}{100}$ to $\frac{1}{1000}$. It is possible to form an optical waveguide with a structure having a large gradient in refraction index. Since preliminary discharge is performed, it is possible to cause a current to flow uniformly in the discharge tube 10.

In some example embodiments, the elements other than the main laser beam irradiation control unit 44 of the controller 40 in the electron accelerator 100 constitute the optical waveguide forming apparatus 1 (see FIG. 1). Step S2 constitutes the first step. Steps S4 to S6 constitute the second step. Steps S3, S7, and S8 constitute the third step.

Second Embodiment

A soft X-ray laser irradiation apparatus (an X-ray laser irradiation apparatus) according to a second embodiment will be described below. In the following description, differences from the first embodiment will be described and repeated description will be omitted.

Figure 5:
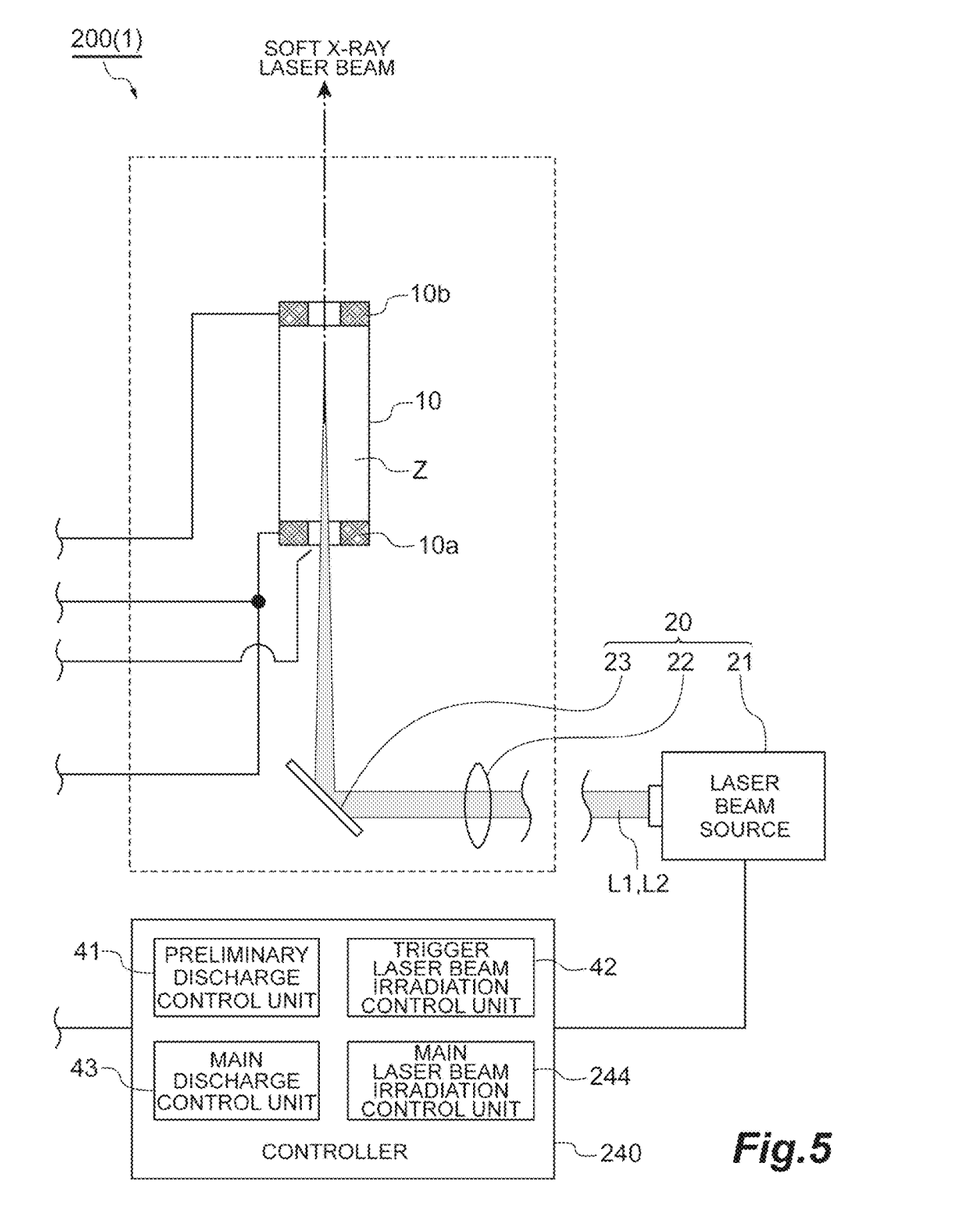
FIG. 5 is a diagram schematically illustrating a configuration of a soft X-ray laser irradiation apparatus according to a second embodiment.

FIG. 5 is a diagram schematically illustrating a configuration of a soft X-ray laser irradiation apparatus 200 including the optical waveguide forming apparatus 1. The soft X-ray laser irradiation apparatus 200 is an apparatus that applies a soft X-ray laser beam by driving a laser. In the soft X-ray laser irradiation apparatus 200, a pulse laser beam which is emitted from a laser beam source 21 is, for example, an infrared laser beam. The soft X-ray laser irradiation apparatus 200 includes a controller 240 including a main laser beam irradiation control unit (a third irradiation control unit) 244 instead of the controller 40 (see FIG. 1) as a functional configuration.

The main laser beam irradiation control unit 244 causes the laser beam source 21 to irradiate the internal space Z with a main laser beam L2 in an optical waveguide formation time after irradiation of the internal space Z by the trigger laser beam L1. Accordingly, similarly to the first embodiment, the main laser beam L2 can be guided to an optical waveguide which is transiently formed in the internal space Z and an inversely distributed state in which a soft X-ray laser beam is oscillated can be formed in the internal space Z. As a result, a beam generated by spontaneous emission is amplified and a soft X-ray laser beam is emitted from the positive electrode 10b side of the discharge tube 10.

In some example embodiments, the main laser beam L2 may be configured to form the inversely distributed state to propagate in the optical waveguide which is transiently formed. In this embodiment, a soft X-ray laser beam may be emitted from the discharge tube 10 by causing the same type of laser beams to enter the internal space Z of the discharge tube 10.

Third Embodiment

A scattered X-ray generator according to a third embodiment will be described below. In the following description, differences from the first embodiment will be described and repeated description will be omitted.

Figure 6:
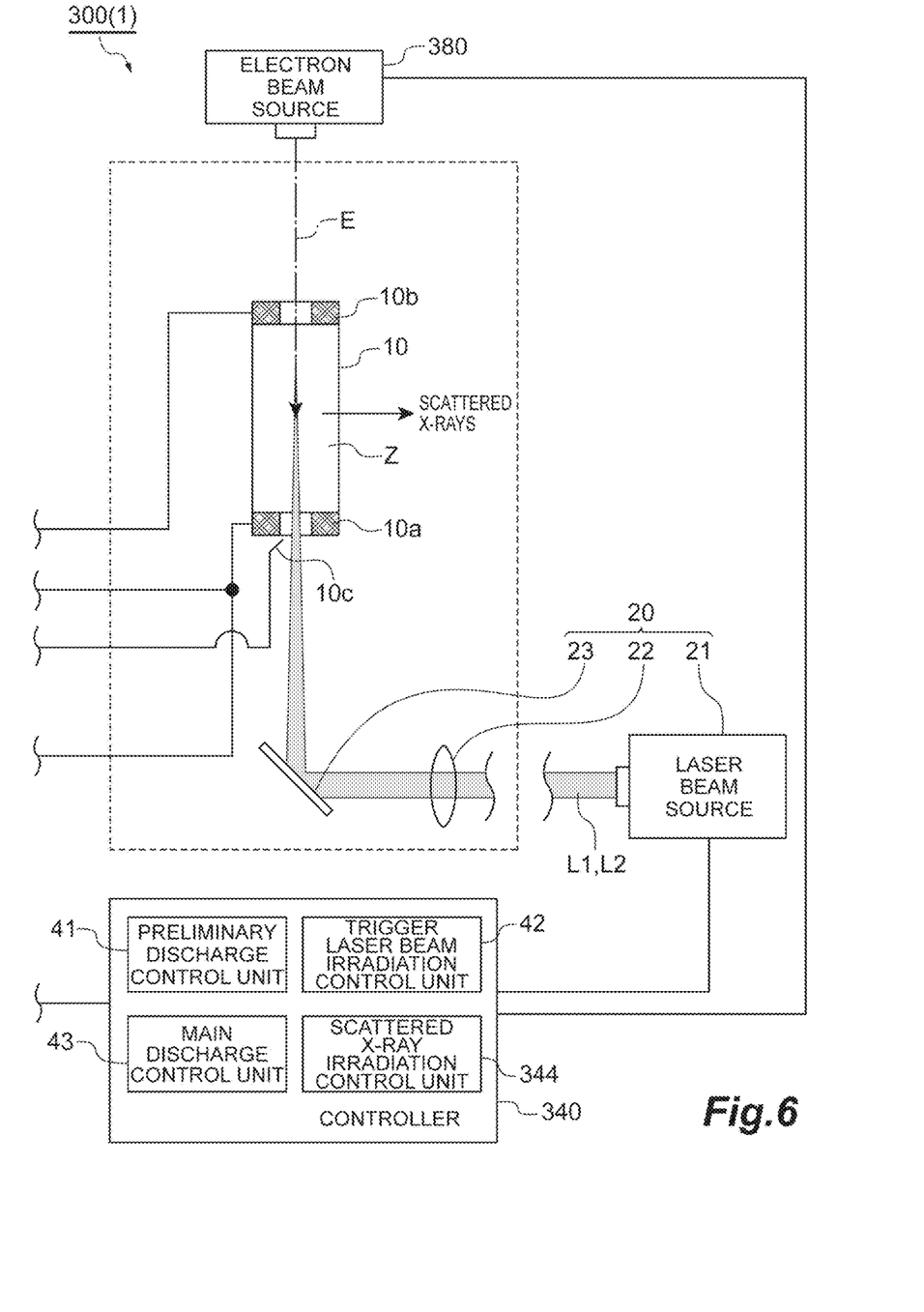
FIG. 6 is a diagram schematically illustrating a configuration of a scattered X-ray generator according to a third embodiment.

FIG. 6 is a diagram schematically illustrating a configuration of a scattered X-ray generator 300 including the optical waveguide forming apparatus 1. The scattered X-ray generator 300 is an apparatus that generates scattered X-rays by Compton scattering. In the scattered X-ray generator 300, a pulse laser beam emitted from the laser beam source 21 is, for example, a visible laser beam. The scattered X-ray generator 300 further includes an electron beam source 380 that irradiates the internal space Z of the discharge tube 10 with an electron beam E to collide with the main laser beam L2. The electron beam source 380 causes the electron beam E to enter the internal space Z from the positive electrode 10b side of the discharge tube 10. The scattered X-ray generator 300 includes a controller 340 including a scattered X-ray irradiation control unit (a fourth irradiation control unit) 344 instead of the controller 40 (see FIG. 1) as a functional configuration.

The scattered X-ray irradiation control unit 344 causes the laser beam source 21 to irradiate the internal space Z with a main laser beam L2 in an optical waveguide formation time after the internal space is irradiated by the trigger laser beam L1. The scattered X-ray irradiation control unit 344 further causes the electron beam source 380 to irradiate internal space Z with an electron beam E. Accordingly, similarly to the first embodiment, in the optical waveguide which is transiently formed in the internal space Z, the main laser beam L2 and the electron beam E are caused to propagate and collide with each other, and thus scattered X-rays are generated by Compton scattering.

In some example embodiments, the main laser beam L2 and the electron beam E which generate scattered X-rays by Compton scattering can be satisfactorily guided to the optical waveguide which is transiently formed.

Modified Examples

In some example embodiments, the discharge tube 10 is used as the gas-enclosed vessel in which gas is enclosed, but the gas-enclosed vessel is not limited to the discharge tube 10 and various vessels can be used. Additionally, the main discharge pulse current is caused to flow in the discharge tube 10 to increase the pulse current by irradiation of the internal space Z with the trigger laser beam L1, but the pulse current may be increased from the time of irradiation with the trigger laser beam L1 as long as a polyvalent ionization channel can contract by the pinch effect.

In some example embodiments, the optical waveguide formation time (the predetermined time) may be determined (controlled) on the basis of a type and a density of gas enclosed in the internal space Z and on the basis of a current value of a pulse current flowing in the discharge tube 10. It is possible to understand influences of the inverse pinch effect and the pinch effect using the parameters such as the type and density of gas and the current value of the pulse current flowing in the gas-enclosed vessel. Accordingly, it is possible to accurately determine the optical waveguide formation time on the basis of such parameters. By applying the main laser beam L2 in the determined optical waveguide formation time, it is possible to more easily and accurately synchronize the main laser beam L2 with the optical waveguide and to more satisfactorily guide the main laser beam L2 to the optical waveguide.

The optical waveguide forming apparatus may be applied to various apparatuses using an optical waveguide and may be applied, for example, to a dynamic electron microscope, in order to satisfactorily guide a pulse laser beam to an optical waveguide which is transiently formed.

Therefore, it is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

The invention claimed is:

1. An optical waveguide forming method of forming an optical waveguide using a gas-enclosed vessel that has an internal space in which a polyvalent ionizable gas is enclosed, a laser beam irradiation device that irradiates the internal space with a pulse laser beam, and a discharge circuit that causes a pulse current to flow in the gas-enclosed vessel, the optical waveguide forming method comprising:
   a first step of causing the pulse current to flow in the gas-enclosed vessel using the discharge circuit such that the internal space enters a plasma state;
   a second step of forming a polyvalent ionization channel in the internal space and causing the polyvalent ionization channel to expand by an inverse pinch effect by irradiating the internal space in the plasma state with the pulse laser beam as a trigger laser beam from the laser beam irradiation device; and
   a third step of increasing a current value of the pulse current flowing in the gas-enclosed vessel before or during the irradiation with the trigger laser beam.

2. The optical waveguide forming method according to claim 1, wherein the third step includes transiently forming the optical waveguide in the internal space after the irradiation with the trigger laser beam.

3. The optical waveguide forming method according to claim 1, wherein the second step includes forming the polyvalent ionization channel which is filament-shaped fully ionized plasma by the irradiation with the trigger laser beam.

4. The optical waveguide forming method according to claim 1, wherein the third step includes causing the expanded polyvalent ionization channel expanded by the inverse pinch effect in the second step to contract using a pinch effect after the irradiation with the trigger laser beam by increasing the current value of the pulse current flowing in the gas-enclosed vessel before or during the irradiation with the trigger laser beam and transiently forming the optical waveguide in the internal space at a predetermined time after the irradiation with the trigger laser beam.

5. The optical waveguide forming method according to claim 4, wherein the predetermined time is determined based on a rising peak time in a monitored voltage waveform which is applied to the gas-enclosed vessel when the optical waveguide is transiently formed in the internal space.

6. The optical waveguide forming method according to claim 4, wherein the predetermined time is determined based on a type and a density of the gas enclosed in the internal space and the current value of the pulse current flowing in the gas-enclosed vessel.

7. An optical waveguide forming apparatus comprising:
   a gas-enclosed vessel that has an internal space in which a polyvalent ionizable gas is enclosed;
   a laser beam irradiation device that irradiates the internal space with a pulse laser beam;
   a discharge circuit that causes a pulse current to flow in the gas-enclosed vessel; and
   a controller that controls the pulse laser beam emitted from the laser beam irradiation device and the pulse current flowing in the gas-enclosed vessel by the discharge circuit,
   wherein the controller includes
      a first pulse current control unit that causes the pulse current to flow in the gas-enclosed vessel using the discharge circuit such that the internal space enters a plasma state,
      a first irradiation control unit that forms a polyvalent ionization channel in the internal space and causes the polyvalent ionization channel to expand by an inverse pinch effect by irradiating the internal space in the plasma state with the pulse laser beam as a trigger laser beam from the laser beam irradiation device, and
      a second pulse current control unit that increases a current value of the pulse current flowing in the gas-enclosed vessel from before or during the irradiation with the trigger laser beam.

8. The optical waveguide forming apparatus according to claim 7, wherein the second pulse current control unit transiently forms the optical waveguide in the internal space after the irradiation with the trigger laser beam.

9. The optical waveguide forming apparatus according to claim 7, wherein the first irradiation control unit forms the polyvalent ionization channel which is filament-shaped fully ionized plasma by the irradiation with the trigger laser beam.

10. The optical waveguide forming apparatus according to claim 7, wherein the second pulse current control unit causes the expanded polyvalent ionization channel to contract using a pinch effect and transiently forms the optical waveguide in the internal space at a predetermined time after the irradiation with the trigger laser beam.

11. An electron accelerator comprising the optical waveguide forming apparatus according to claim 7,
   wherein the controller further includes a second irradiation control unit that guides a main laser beam to the optical waveguide transiently formed in the internal space and generates a laser wake field for accelerating an electron beam in the internal space by irradiating the internal space with the pulse laser beam as the main laser beam from the laser beam irradiation device after the irradiation with the trigger laser beam.

12. An X-ray laser irradiation apparatus comprising the optical waveguide forming apparatus according to claim 7,
   wherein the controller further includes a third irradiation control unit that guides a main laser beam to the optical waveguide transiently formed in the internal space and forms an inversely distributed state in which an X-ray laser beam is oscillated in the internal space by irradiating the internal space with the pulse laser beam as the main laser beam from the laser beam irradiation device after the irradiation with the trigger laser beam.

13. A scattered X-ray generator comprising:
   the optical waveguide forming apparatus according to claim 7; and an electron beam source that irradiates the internal space with an electron beam to collide with the pulse laser beam from the laser beam irradiation device, wherein the controller further includes a fourth irradiation control unit that generates scattered X-rays in the optical waveguide transiently formed in the internal space by Compton scattering by irradiating the internal space with the pulse laser beam as the main laser beam from the laser beam irradiation device after the irradiation with the trigger laser beam and irradiating the internal space with the electron beam from the electron beam source.

\* \* \* \* \*